(12) United States Patent
Laurent (10) Patent No.: US 6,671,598 B2
(45) Date of Patent: Dec. 30, 2003

(54) ELECTRICAL STEERING FOR VEHICLE

(75) Inventor: Daniel Laurent, La Suisse (FR)

(73) Assignee: Conception et Developpement Michelin S.A., Givisiez (CH)

( * ) Notice: Subject to any disclaimer, the term of this patent is extended or adjusted under 35 U.S.C. 154(b) by 0 days.

(21) Appl. No.: 10/301,082

(22) Filed: Nov. 21, 2002

(65) Prior Publication Data

US 2003/0120405 A1 Jun. 26, 2003

(30) Foreign Application Priority Data

Nov. 23, 2001 (FR) .......................... 01 15222

(51) Int. Cl.$^7$ ............................................. B62D 11/00
(52) U.S. Cl. ...................... 701/41; 180/443; 180/410
(58) Field of Search ........................ 701/41; 180/443, 180/445, 410, 411, 413

(56) References Cited

U.S. PATENT DOCUMENTS

| | | | |
|---|---|---|---|
| 2,203,810 A | | 6/1940 | Berry |
| 3,944,014 A | * | 3/1976 | Maisch et al. ............... 180/446 |
| 5,076,382 A | * | 12/1991 | Vaughn et al. ............... 180/413 |
| 5,217,083 A | * | 6/1993 | Bachhuber et al. .......... 180/415 |
| 5,348,111 A | | 9/1994 | Williams et al. ............ 180/140 |
| 5,379,220 A | * | 1/1995 | Allen et al. .................... 701/41 |
| 5,492,348 A | | 2/1996 | Shaw et al. ................ 180/79.1 |
| 5,925,083 A | * | 7/1999 | Ackermann .................... 701/41 |
| 6,097,286 A | * | 8/2000 | Discenzo ..................... 340/465 |
| 6,113,119 A | | 9/2000 | Laurent et al. ........... 280/124.1 |
| 6,170,838 B1 | | 1/2001 | Laurent et al. ........... 280/5.508 |
| 6,192,304 B1 | * | 2/2001 | Goetz ........................... 701/41 |
| 6,219,604 B1 | * | 4/2001 | Dilger et al. .................. 701/41 |
| 6,406,036 B1 | | 6/2002 | Laurent et al. ........... 280/5.509 |
| 6,474,688 B1 | | 11/2002 | Bogren et al. ............... 280/771 |
| 6,549,835 B2 | * | 4/2003 | Deguchi et al. ............... 701/41 |

FOREIGN PATENT DOCUMENTS

| | | | |
|---|---|---|---|
| DE | 4303342 | 8/1994 | |
| DE | 4404594 | 8/1995 | |
| DE | 19918355 | 10/2000 | |
| DE | 10050578 | 4/2001 | |
| EP | 1136344 | 9/2001 | |
| FR | 2723714 | 2/1996 | |
| JP | 60193770 A | * 10/1985 | ............ B62D/7/14 |
| WO | 0034106 | 6/2000 | |
| WO | 0228677 | 4/2002 | |

* cited by examiner

*Primary Examiner*—Yonel Beaulieu
*Assistant Examiner*—Eric M Gibson
(74) *Attorney, Agent, or Firm*—Baker Botts L.L.P.

(57) ABSTRACT

For a vehicle, all of whose road wheels are steerable wheels, the steering instructions are transmitted by electrical means. The vehicle path is altered by a device comprising a component which is similar to a steering wheel, and has two handles 32G, 32D arranged at a certain distance from the rotary shaft and preferably substantially symmetrically with respect to it. The rotary shaft is provided with at least one angle-of-rotation sensor 34 and has a sensor for the tilting force of the handles. The driver turns the handles 32G and 32D clockwise to turn right and anticlockwise to turn left. The driver applies selected tilting forces to the handles 32G and 32D to displace the vehicle transversely to the left or the right, while keeping its longitudinal orientation unchanged.

13 Claims, 5 Drawing Sheets

ELECTRICAL STEERING FOR VEHICLE

BACKGROUND OF THE INVENTION

1. The Field of Invention

The present invention relates to control of the change of trajectory of a motor vehicle and, more particularly, to a device for acting on the trajectory of a vehicle by electrical means.

2. The Related Art

In the current state of the art, the steering of a passenger motor vehicle is usually controlled by means of a steering wheel. The driver turns the steering wheel one way or the other in order to point the vehicle in one or the other direction. In this manner, the driver applies a yaw movement to the vehicle. In other respects, electrical control means for all of the actuators of a motor vehicle, and in particular the steering, are being developed to an increasing extent. This technology is known by the name "steer by wire".

The technology for controlling actuators via an electrical link consists in replacing with electric links the linkages, which are generally hydraulic or mechanical at present, between the operating device and the actuators. For instance, as regards the steering of motor vehicles, the following system will be substituted for the traditional mechanical system, which may be assisted or unassisted, existing between the steering wheel and the steerable wheels. The steering operating component available to the driver of the vehicle may be a traditional steering wheel or a lever such as a joystick. At the road-wheel level, there is an electrical actuator, preferably an individual one for each road wheel. The instructions applied by the driver of the vehicle to his operating device are sent to the actuators via an electrical link, with the entire system being placed under the supervision of a direction controller loaded with programs suitable for driving the actuators appropriately.

The advantage of this technology is that it is ideally compatible with advances in electronics, which are making increasingly sophisticated feedback control systems possible; and which make it possible not only for the steering of the road wheels to be subject to the manual controls but also for the steering to be supervised by a safety system. For instance, the road wheels may be set to an angle which not only takes into account the instructions from the driver of the vehicle, but which also takes into account dynamic parameters observed in the vehicle.

When a driver wishes to change the trajectory of his vehicle, this may correspond to two requirements which are quite different in nature. The first requirement is to take a turn, in which case it is necessary to apply a yaw acceleration to the vehicle, followed by a phase in which the yaw rate varies little, then a yaw deceleration on exiting the turn, in order to obtain a direction of travel which is different after the maneuver compared with what it was before the maneuver. When overtaking a vehicle on a road or a motorway, it is known that the driver adjusts the steering wheel in order to apply a small turn to the left, in countries where vehicles are driven on the right, immediately followed by a small turn to the right after the vehicle has moved sideways to a sufficient extent. Lastly, to complete the overtaking maneuver, another small turn in order to change the orientation of the vehicle so as to rejoin the initial traffic lane, and finally a fourth small turn. It will therefore be understood that, in order to perform an overtaking maneuver, it is necessary to apply two transverse accelerations to the vehicle by means of four yaw accelerations. However, only the transverse accelerations are in fact useful for an overtaking maneuver in a straight line.

SUMMARY OF THE INVENTION

It is therefore an object of the present invention to provide an electrical system for controlling the trajectory of a vehicle, all of whose road wheels are steerable wheels, the steering angle being applied individually and selectively to each of the steerable wheels by a dedicated electrical actuator. The electrical system has an operating means, available to the driver for acting on the trajectory of the vehicle and further has a trajectory controller which determines a road-wheel steering angle for each of the steerable wheels as a function of at least one signal delivered by the operating means and as a function of at least one signal representing the actual trajectory of the vehicle. The trajectory controller is programmed so as to ensure consistency between the trajectory desired by the driver, effected by his actions on the operating component, and the actual trajectory, as may be observed by appropriate sensors (examples of which include a longitudinal speed sensor, a transverse acceleration sensor and a yaw sensor).

It is also an object of the present invention, independently of the previous object, to provide the driver of a vehicle with a specific operating component, which makes it possible to cause transverse translation of the vehicle at constant heading. This operating component is independent of the operating component for turning the vehicle, that is to say, independent of the yaw control (change of heading). The intended object is to provide an operating device which is as familiar as possible to a driver, who is already accustomed to the use of a steering wheel for acting on the trajectory of his vehicle, while also providing the opportunity for improvement.

Accordingly, the present invention retains the use of a first operating component of the "steering wheel" type for applying changes of direction to the vehicle. As a reminder, a change of direction corresponds to a change of heading. The instructions for changing the direction of the vehicle are given conventionally, that is to say, by applying a rotation to this first component. In order to decouple the controls for transverse translation of the vehicle, at constant heading, from the controls for changing the direction of the vehicle (change of heading), the present invention proposes to equip the operating device with a specific operating second component for applying a transverse displacement to the vehicle at constant heading (that is to say, without yaw).

Consequently, the invention relates to an operating device for acting on the trajectory of a vehicle, all of whose road wheels are steerable wheels, with displacement instructions for the steerable wheels being transmitted by electrical means, the operating device having a first operating component for applying a yaw movement to the vehicle, the first operating component essentially having a rotary shaft to which are secured two handles which are arranged at a certain distance from the rotary shaft, which rotary shaft is provided with at least one angle-of-rotation sensor and with a means for returning to a straight-line position, and having a second operating component for applying a yaw-free transverse displacement to the vehicle.

BRIEF DESCRIPTION OF THE DRAWINGS

Exemplary embodiments of the invention are described in more detail by reference to the following figures, in which.

DETAILED DESCRIPTION OF EXEMPLARY EMBODIMENTS

Figure 1:
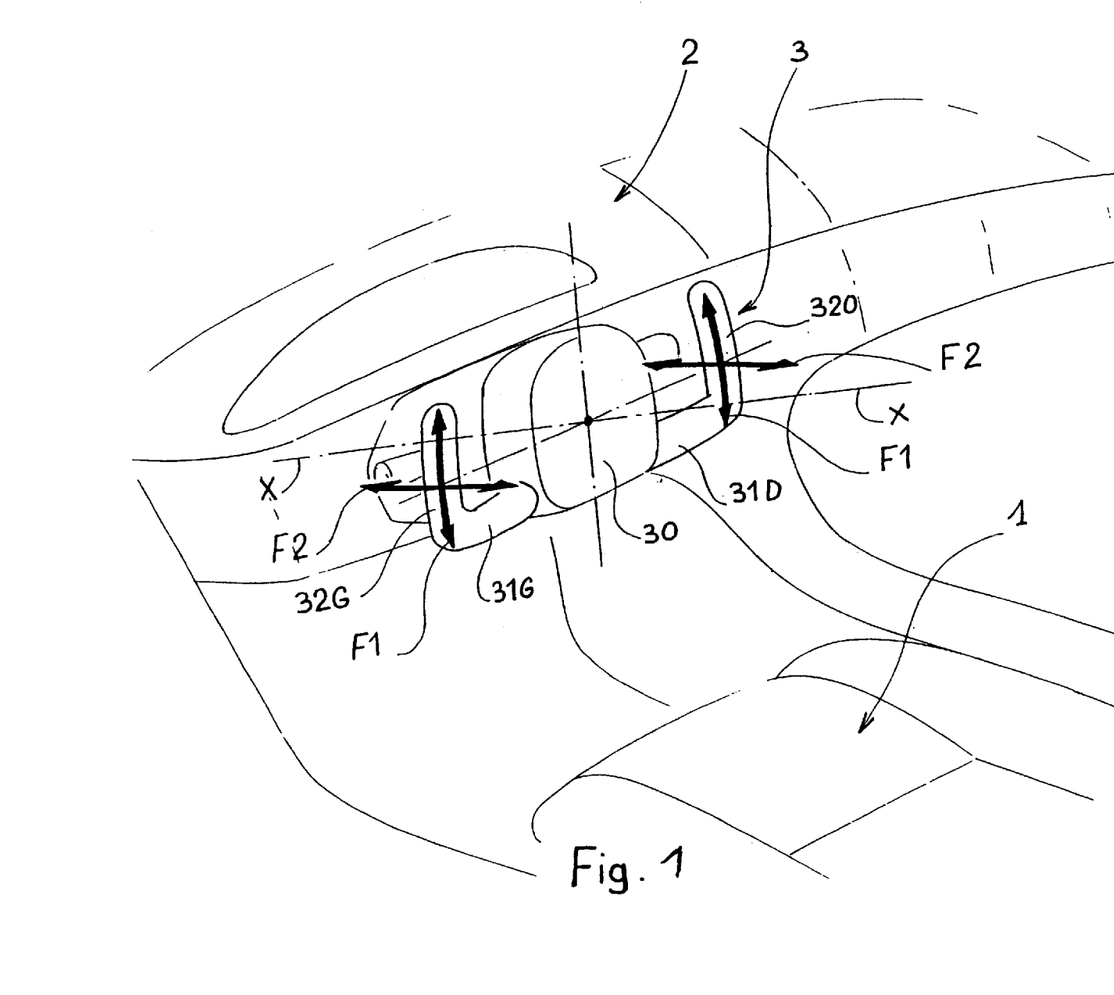
FIG. 1 shows an operating device installed in the passenger compartment of a vehicle.

FIG. 1 shows a driver's seat 1, a dashboard 2 and the operating device 3 provided by the present invention. A central part 30 of the device 3 is connected to a rotary shaft 33 (see FIG. 2), which central part 30 may contain an air bag as normal steering wheels do. On either side of the central part 30, and connected to it, are two branches 31G and 31D which are extended by two handles 32G and 32D, respectively, the latter being arranged at a certain distance from the rotary shaft 33 and preferably substantially symmetrically with respect to it.

Figure 2:
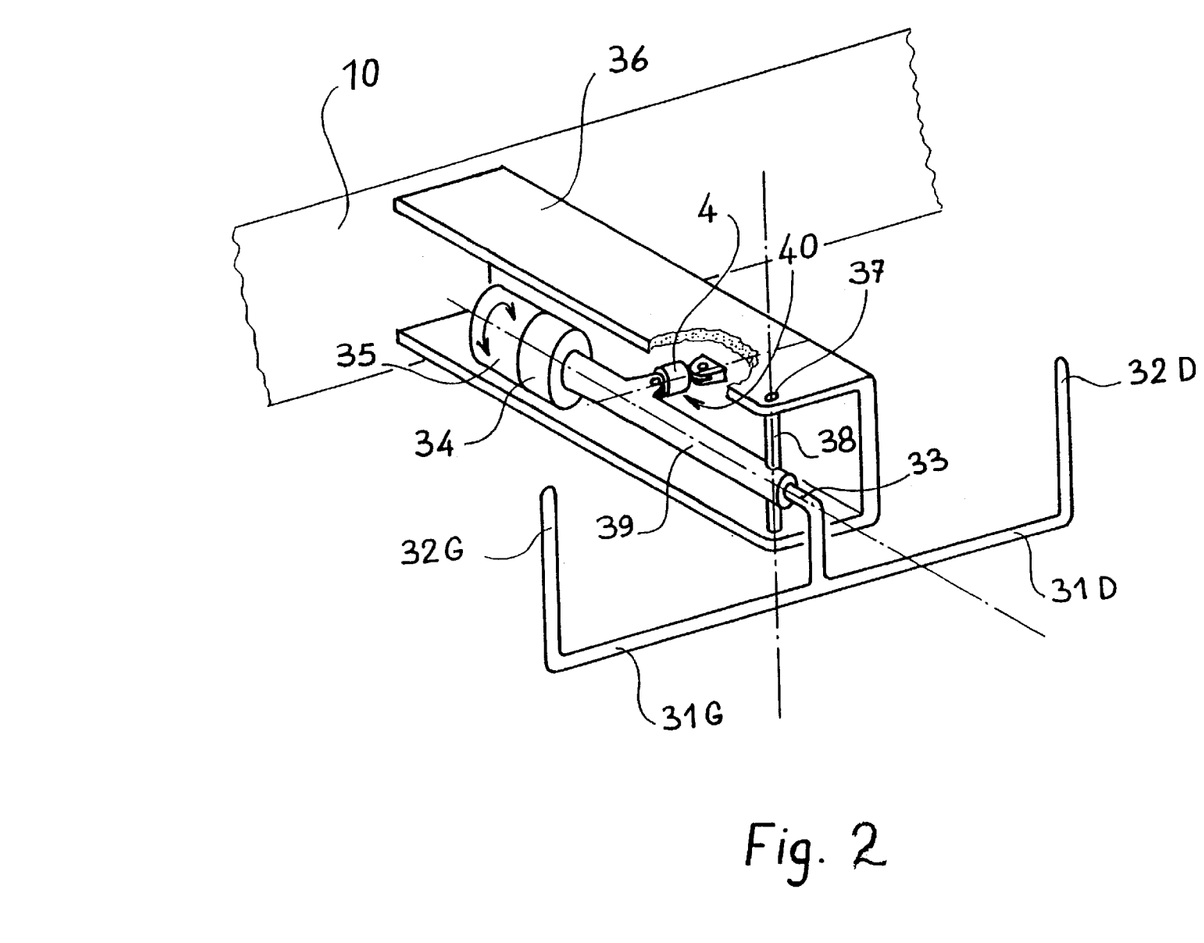
FIG. 2 is a diagram showing further details of the arrangement of one embodiment of the operating device.

In FIG. 2, it can be seen that the rotary shaft 33 is provided with at least one angle-of-rotation sensor 34 and with a means 35 for returning to a straight-line position. A housing 36 belonging to the rigid structure 10 of the vehicle ends in a base 37, the base forming bearings for a spindle 38 fitted so as to rotate on the ends of the base 37. This spindle 38 is furthermore secured to the shaft of a sleeve 39, inside which the rotary shaft 33 is fitted so as to rotate freely with respect to the sleeve 39. Lastly, a connecting rod 4 equipped with an extension/compression force sensor 40 connects the sleeve 39 to the housing 36.

The rotation sensor 34, the means 35 (e.g., a spring) for returning to a straight-line position, and the force sensor 40 are conventional and well known in the art.

To take a turn, the action by the driver is identical to what he would do for a passenger vehicle existing at present. He turns the handles 32G and 32D clockwise to turn right and clockwise to turn left, as schematised by the arrows F1 in FIG. 1. The possible rotation is through an angle limited to a value very much less than +90° or −90°. The rotation covers, for example, the range of from −30° to +30°. The handles 32G and 32D essentially constitute the first operating component. The handles 32G and 32D constitute a powerful lever of action comparable with a traditional steering wheel, to which the driver applies an angle variation corresponding to an instruction for changing the yaw rate.

The operating device 3 available to the driver has a second operating component for acting on the trajectory of the vehicle, which can be used to effect a requirement for transverse displacement at constant heading.

In a first alternative embodiment, this second operating component has at least one force sensor which is designed to detect an action tending to push the handles 32G and 32D about a tilting axis substantially perpendicular to the rotary shaft 33, the tilting axis being preferably substantially contained in the plane of symmetry of the first component. In this case, the shaft 33 is arranged roughly horizontally; that is to say, like the steering column of modern passenger vehicles.

The driver applies a tilting force to the handles 32G and 32D, as schematised by the arrows F2 in FIG. 1; for example, a force tending to move the handle 32G away in order to displace the vehicle transversely to the left, while keeping its longitudinal orientation unchanged, and a force tending to move the handle 32D away in order to displace the vehicle transversely to the right, while keeping its longitudinal orientation unchanged. According to a first option, this force does not cause any displacement, rather there is preferably a minimum threshold to be exceeded before altering the trajectory. This force is measured by the sensor 40. There are other implementation options. For example, the operating component may be configured in such a way that there is a small displacement, in particular beyond a certain threshold while the operating component is active.

In a second alternative embodiment, the second operating component for acting on the trajectory of the vehicle includes at least one sensitive trigger, for example one on each handle, one actuating the transverse displacement at constant heading in one way and the other actuating the transverse displacement at constant heading in the other way, as a function of the amplitude of the pressure exerted on the trigger. In this variant, there is no particular reason why the orientation of the shaft 33 should be roughly horizontal, in contrast to what was indicated above.

Figure 3:
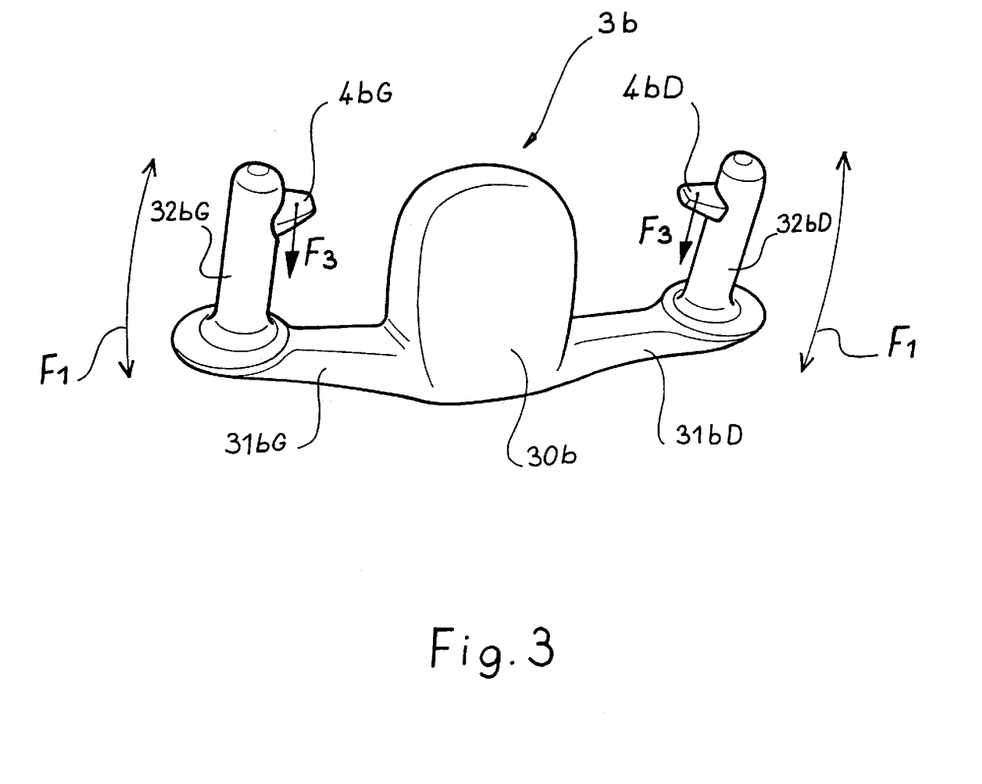
FIG. 3 shows an alternative embodiment of an operating device installed in the passenger compartment of a vehicle.

FIG. 3 shows an exemplary embodiment of an operating device 3b according to this second alternative embodiment of the invention. Several parts are very similar to what is found in the first alternative embodiment, namely a central part 30b and two branches 31bG and 31bD, which are extended by two handles 32bG and 32bD, respectively. Shown on the handles 32bG and 32bD are triggers 4bG and 4bD, respectively, which are arranged at a position selected to as to be thumb-actuated readily at will, without any risk of being actuated unintentionally, for example when rotating the operating device 3b.

To take a turn, the action by the driver is identical to what was explained above. To obtain a transverse displacement at constant heading, the driver operates one or other of the triggers 4bG or 4bD. For example, to displace the vehicle transversely to the left, he presses the trigger 4bG, whereas to displace the vehicle transversely to the right, he presses the trigger 4bD. This operation of one or other of the triggers 4bG or 4bD may, of course, be combined with a rotation of the operating device 3b, in order to combine a certain degree of transverse displacement and a requirement for a change of heading.

In the case of a transverse translation at constant heading, the instruction applied by the driver (arrows F2 in FIG. 1 or operation F3 of one of the buttons 4bG and 4bD in FIG. 3) is processed so that all of the road wheels of the vehicle are steered in the same direction and through the same angle. More generally, in the event of a requirement for transverse translation without a requirement for a change of heading, irrespective of whether or not the vehicle is currently carrying out a change of heading, the variation in steering angle is identical for all the road wheels of the vehicle. Therefore, the instruction applied by the driver (arrows F2 in FIG. 1 or operation F3 of one of the buttons 4bG and 4bD in FIG. 3) is processed so that all the road wheels of the vehicle are steered in the same direction and through the same angle (or, more generally, so that the variation in steering angle is identical for all the road wheels). In this way, the vehicle is not subjected to yaw accelerations which are superfluous to the maneuver, and which are all the more problematic since the vehicle has a large yaw inertia. This reduces the wear on the tires. A vehicle equipped in this way will pass the so-called "elk" test much more easily. This is the advantage provided by dual operating components which separately alter the yawing and the pure transverse displacement.

The instructions applied by the driver of the vehicle to his control means, both the rotation schematised by the arrows F1 and the instruction schematised by the arrows F2 or F3, are sent to a trajectory controller (not shown) loaded with programs suitable for driving the electrical actuators at the guiding road-wheel level, preferably individually for each road wheel. Preferably, the gearing reduction ratio between the handles 32G and 32D (instruction according to the arrows F1) and the steering of the road wheels can be varied as a function of the longitudinal speed at which the vehicle is moving, which it is easy for the trajectory controller to take into account.

Of course, to make it possible to carry out a yaw-free transverse displacement, that is to say, one without a change of heading (instruction schematised by the arrows F2 or F3), it is expedient for all the road wheels of the vehicle to be steerable wheels, so that they can all be steered through the same angle, to within the slip of the tires. Purely by way of illustration, it should be emphasized that the technologies described in U.S. Pat. No. 6,113,119, U.S. Pat. No. No. 6,170,838 and U.S. Pat. No. No. 6,406,036 are highly compatible with the construction of a vehicle in which all the road wheels are steerable wheels, and the subjects matter thereof are hereby incorporated by references for all purposes. More generally, the prerequisite for implementing the invention is that at least one actuator for steering the road wheels must be installed on each axle. Each axle may have a mechanical linkage between the steerable wheels, such as a steering rack, and the sliding of the latter may be controlled by a single electrical actuator.

In a more sophisticated embodiment of the present invention, an electrical actuator may also be installed on each road wheel, in order to control the steering angle individually for each road wheel. The consistency between the individual steering operations, as a function of the trajectory desired for the vehicle, is then ensured by the trajectory controller.

Of course, the trajectory controller may superimpose optional corrections, determined by a trajectory control function such as that provided by an ESP system and/or such as that resulting from dialogue with a traffic control means external to the vehicle and/or dialogue with a vehicle positioning means such as GPS, on the instructions applied by the driver of the vehicle to his control means. The trajectory controller determines the steering angle for each of the road wheels accordingly. In this case, the steering angle of each road wheel includes a contribution resulting from the instructions applied by the driver of the vehicle to his control means and a corrective contribution.

When driving at cruising speed, the driver will effect requirements to change the heading with or without variation of the yaw rate, and both may of course be combined, for example to overtake on a turn.

It is important to be able to take into account the experience of motor vehicle drivers. The present invention makes it possible to offer an additional degree of freedom for trajectory control while keeping the usual means for controlling the change of direction of the vehicle. For instance, a driver not accustomed to such an additional operating component may very well not utilize it, and operate merely by turning the steering wheel. Furthermore, it is possible to assimilate such an additional operating component progressively.

In an electrical system for acting on the trajectory of a vehicle with multiple steerable wheels, there is preferably one actuator for each steerable wheel. A controller makes it possible to selectively apply an appropriate steering angle for each of the steerable wheels, as a function of at least the location of the steerable wheel on the vehicle, the speed of the vehicle and the required change of trajectory.

Figure 4:
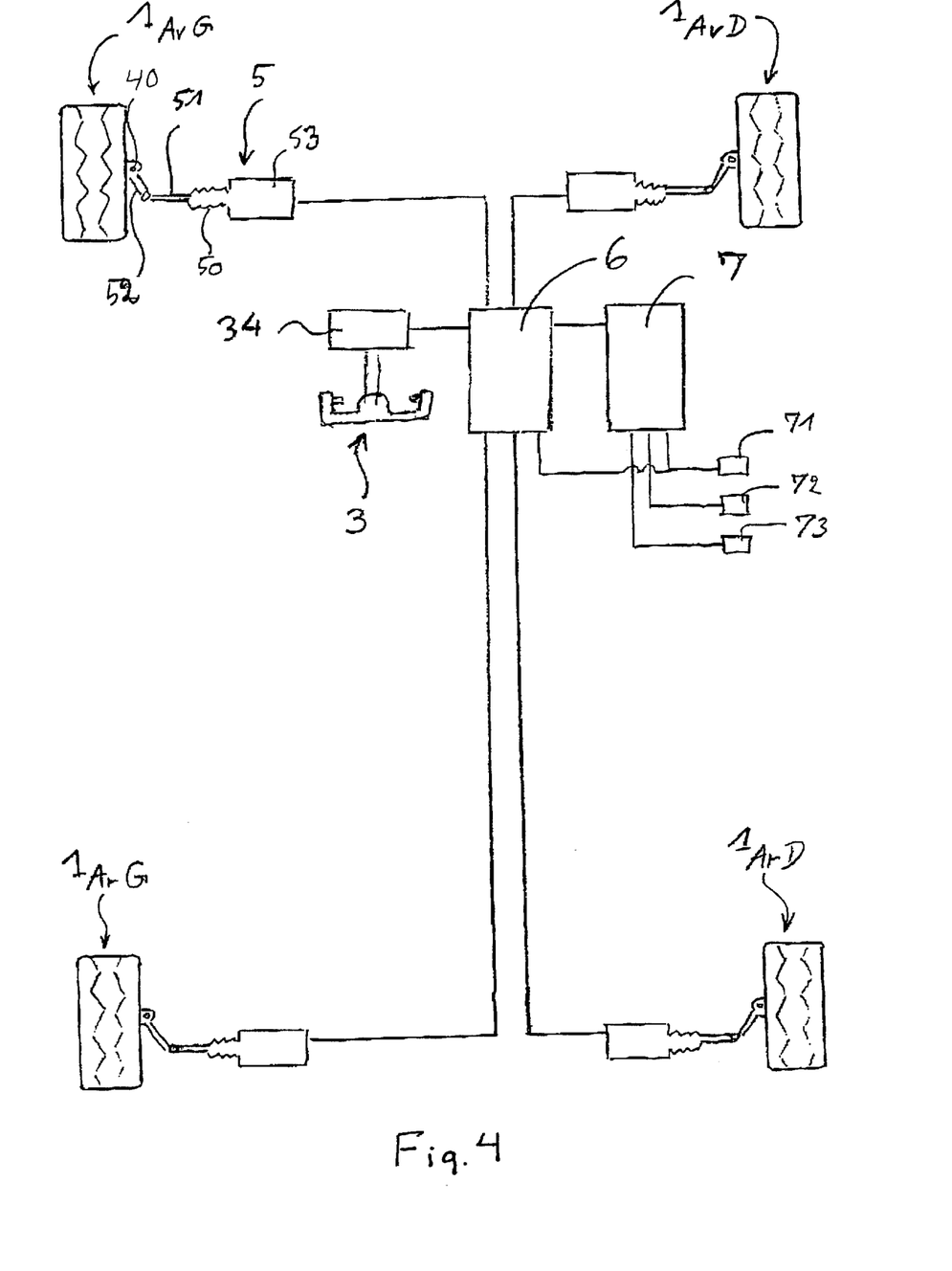
FIG. 4 is a schematic illustration of a four steerable-wheel vehicle equipped with an electrical system in accordance with the invention for controlling the steering angle of each wheel.

FIG. 4 illustrates a four-steerable wheel vehicle equipped with an electrical system in accordance with the invention. The location of the various steerable wheels is marked on the vehicle: the front-left steerable wheel 1AvG, the front-right steerable wheel 1AvD, the rear-left steerable wheel ArG, and the rear-right steerable wheel 1ArD. As shown for the front-left steerable wheel 1AvG only (the other wheels are similarly configured), the wheel is steerable about a vertical axis 48 by means of an electrical actuator 5 having an electric motor(s) 53 and an actuating rod 51 connected to a lever 52, which in turn is connected to the wheel. A protective bellows 50 may be provided. The actuator 5 is preferably constructed in accordance with the disclosure of the commonly-owned U.S. patent application Ser. No. 10/301,083 for "Electrical Steering for Vehicle, With Triple Redundancy", filed concurrently herewith, the subject matter of which is hereby incorporated by reference for all purposes.

Each actuator 5 is electrically coupled to a trajectory controller 6 of the steering system, which system also includes the operating device 3 or a usual steering wheel thereof, the steering angle sensor 34 and the other components of the operating means available to the driver described above in connection with FIGS. 1–3.

The trajectory controller 6 determines a road-wheel steering angle for each of the steerable wheels on the basis of a signal from the driver's operating means, e.g., the steering angle from the sensor 34, and a signal representing the actual trajectory of the vehicle, e.g., from a vehicle speed sensor 71. Preferably, the system also includes a trajectory stability controller 7, which implements a trajectory stability function based on signals from the vehicle speed sensor 71, a transverse acceleration sensor 72, and a yaw rate sensor 73. In such case, the means for superimposing corrections would be included in the trajectory controller 6.

The controllers 6 and 7 and the respective functions which they perform are well known in the art. The electrical and functional interconnections between the trajectory controller and the wheel-angle electrical actuators 5 are preferable implemented in accordance with the aforementioned U.S. application Ser. No. 10/301,083.

Figure 5:
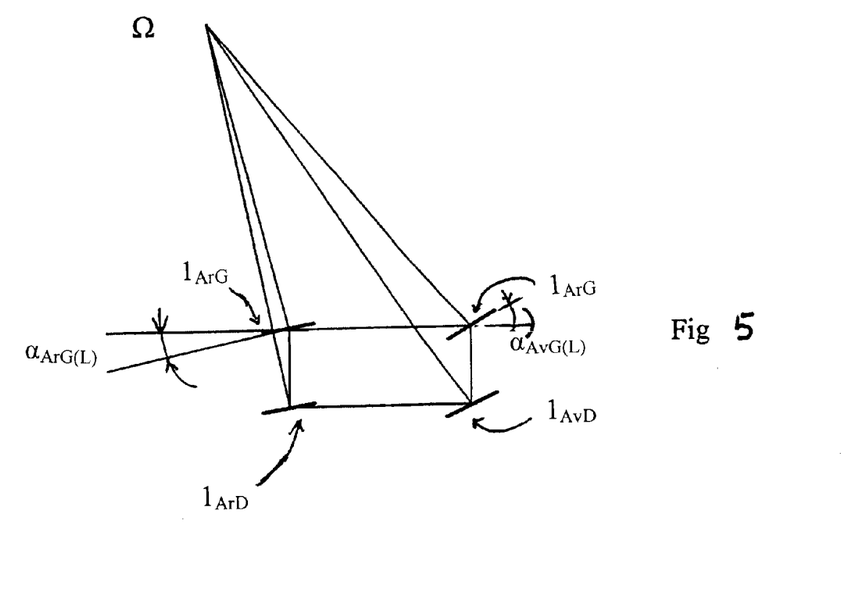
FIG. 5 is a diagram illustrating a change of trajectory with a yaw movement.

FIG. 5 illustrates the case of a yaw movement at cruising speed. It is known that it is useful to steer the rear road wheels in the same direction as the front road wheels, but through an angle $\alpha_{ArG(L)}$ which is much smaller than the angle $\alpha_{AvG(L)}$ at the front, in order to maintain good stability of the vehicle. In general, the trajectory controller which selectively controls the steering angle independently for each of the road wheels may, on the basis of at least one signal delivered by the operating means (for instance a signal representative of the steering-wheel angle set by the driver of the vehicle with a steering wheel or similar device) and taking into account other relevant parameters characterizing the trajectory (such as the longitudinal speed at which the vehicle is moving), determines the spatial location of the ideal instantaneous center of rotation for the vehicle. The instantaneous center of rotation is identified by the point Ω. On this basis, the trajectory controller calculates the steering angle of each of the steerable wheels so that the plane of the road wheel is oriented substantially perpendicularly to the line joining the center of each steerable wheel to the instantaneous center of rotation Ω of the vehicle. Having joined the instantaneous center of rotation Ω to the center of each of the steerable wheels, it is possible to calculate the steering angle of each of the steerable wheels so that the plane of the road wheel is oriented substantially perpendicularly to the line joining the center of the road wheel in question to the instantaneous center of rotation Ω of the vehicle. The trajectory controller is loaded with programs suitable for performing this calculation. Neglecting the side-slip of the tires, the vehicle turns around the instantaneous center of rotation Ω of the vehicle. The instantaneous center of rotation Ω of the vehicle is continuously calculated dynamically, as a function of the driving conditions (speed of the vehicle, yaw rate, etc.).

Figure 6:
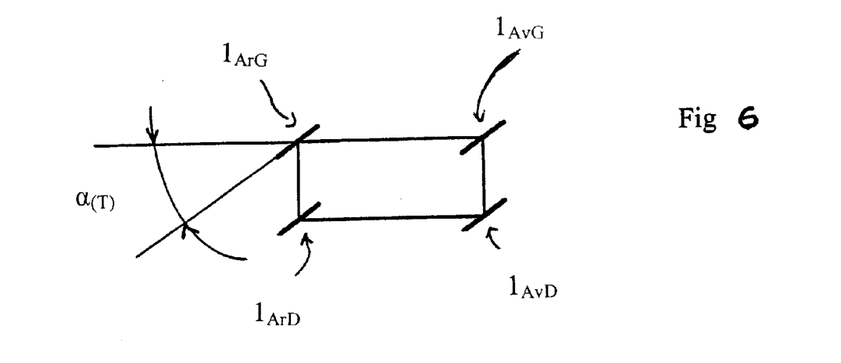
FIG. 6 is a diagram illustrating a change of trajectory at a constant heading.

Lastly, FIG. 6 illustrates the case of a change of trajectory by transverse displacement at a constant heading. This time, it can be seen that all the road wheels are steered through the same angle $\alpha_{(T)}$.

Finally, the invention also extends to an electrical steering system for a vehicle in which only certain road wheels, e.g., the front wheels, are steerable wheels. With respect to FIG. 5, the difference is of course that the angle $\alpha_{Ar}$ is zero on the left and on the right. However, this only constitutes a particular case of the system explained above, in which the trajectory controller which selectively controls the steering angle independently for each of the road wheels on the guiding axle may, on the basis of the steering-wheel angle set by the driver of the vehicle and taking into account other relevant parameters, such as the longitudinal speed at which the vehicle is moving, determines the spatial location of the ideal instantaneous center of rotation (point Ω) for the vehicle, which this time is necessarily located on the virtual straight line joining the centers of the rear road wheels. Likewise, starting from the moment when this instantaneous center of rotation is selected, and by joining it to the center of each of the steerable wheels, it is possible to calculate the steering angle of each of the steerable wheels so that the plane of the road wheel is oriented substantially perpendicularly to the line joining the center of the road wheel in question to the instantaneous center of rotation Ω of the vehicle. The trajectory controller is loaded with programs suitable for continuously performing this calculation dynamically. To within the slip of the tires, the vehicle turns around the instantaneous center of rotation Ω of the vehicle.

The invention, therefore, also provides an electrical system for controlling the trajectory of a vehicle, each of whose steerable wheels is controlled by its own electrical actuator, the steering angle being applied individually and selectively to each of the steerable wheels by its electrical actuator, the system having an operating means for acting on the trajectory of the vehicle, such operating means being available to the driver, and having a trajectory controller which determines the spatial location of the instantaneous center of rotation as a function of at least one signal delivered by the operating means and as a function of at least one signal representing the actual trajectory of the vehicle (for instance, the longitudinal speed of the vehicle) and which calculates the steering angle of each of the steerable wheels so that the plane of the road wheel is oriented substantially perpendicularly to the line joining the center of each of the steerable wheels to the instantaneous center of rotation Ω of the vehicle.

Although the invention has been described herein by reference to specific embodiments thereof, it will be understood that such embodiments are susceptible of modification and variation without departing from the inventive concepts disclosed. All such modifications and variations, therefore, are intended to be encompassed within the spirit and scope of the appended claims.

What is claimed is:

1. An operating device operable by a driver of a vehicle for acting on the trajectory of a vehicle, all of whose road wheels are steerable wheels, with displacement instructions for said steerable wheels being transmitted by electrical means, the operating device comprising:

a first operating component operable by the driver for applying a yaw movement to the vehicle, the first operating component having a rotary shaft to which are secured two handles arranged at a certain distance from the rotary shaft, said rotary shaft being provided with at least one angle-of-rotation sensor and with a means for returning to a straight-line position; and a second operating component operable by the driver for applying a yaw-free transverse displacement to the vehicle independently of the operation of the first operating component.

2. An operating device according to claim 1, in which the second operating component has at least one force sensor which is designed to detect an action tending to tilt said handles about a tilting axis perpendicular to the rotary shaft.

3. An operating device according to claim 1, in which the second operating component includes a sensitive trigger on each handle, one trigger actuating the transverse displacement in one way and the other trigger actuating the transverse displacement in the other way.

4. An operating device according to claim 1, in which the first operating component is at least partially in the form of a steering wheel.

5. An electrical system for controlling the trajectory of a vehicle, all of whose road wheels are steerable wheels, the steering angle being applied individually and selectively to each of the steerable wheels by a dedicated electrical actuator, the electrical system comprising:

an operating means for acting on the trajectory of the vehicle, said operating means being available to the driver, said operating means comprising a first operating component operable by the driver for applying a yaw movement to the vehicle and a second operating component operable by the driver for applying a yaw-free transverse displacement to the vehicle independently of the operation of the first operating component; and a trajectory controller which determines a road-wheel steering angle for each of the steerable wheels, as a function of at least one signal delivered by said operating means and as a function of at least one signal representing the actual trajectory of the vehicle.

6. A system according to claim 5, in which the trajectory controller has means for superimposing optional corrections, determined by a trajectory control function, on the action applied by the driver of the vehicle to the operating means, and for determining the steering angle for each of the road wheels, the said road-wheel steering angle including a contribution resulting from the instructions applied by the driver of the vehicle to the operating means and a corrective contribution.

7. A system according to claim 6, further comprising a trajectory stability controller which implements a trajectory stability function and supplies a signal representative thereof to the trajectory controller.

8. A system according to claim 5, in which the trajectory controller determines the spatial location of the instantaneous center of rotation of the vehicle as a function of at least one signal delivered by said operating means and as a function of at least one signal representing the actual trajectory of the vehicle and calculates the steering angle of each of the steerable wheels so that the plane of each road wheel is oriented substantially perpendicularly to the line joining the center of each steerable wheel to the instantaneous center of rotation of the vehicle.

9. A system according to claim 5, in which the first operating component essentially includes a rotary shaft to which are secured two handles which are arranged at a certain distance from the rotary shaft, said rotary shaft being provided with at least one angle-of-rotation sensor and with a means for returning to a straight-line position.

10. A system according to claim 5, in which the second operating component has at least one force sensor which is designed to detect an action tending to tilt said handles about a tilting axis perpendicular to the rotary shaft.

11. A system according to claim 5, in which the second operating component includes a sensitive trigger on each handle, one actuating the transverse displacement in one way and the other actuating the transverse displacement in the other way.

12. A system according to claim 5, in which the first operating component is at least partially in the form of a steering wheel.

13. A system according to claim 5, in which said signal representing the actual trajectory of the vehicle is a signal representative of the longitudinal speed of the vehicle.

* * * * *

UNITED STATES PATENT AND TRADEMARK OFFICE
CERTIFICATE OF CORRECTION

PATENT NO. : 6,671,598 B2
DATED : December 30, 2003
INVENTOR(S) : Daniel Laurent It is certified that error appears in the above-identified patent and that said Letters Patent is hereby corrected as shown below:

Title page,
Item [75], Inventors, "La Suisse, (FR)" should read -- Marly (CH) --
Item [73], Assignee, "Developpement" should read -- Développement --
Item [30], Related U.S. Application Data, insert
-- May 3, 2002 (FR) ............. 02/5662 --
Item [56], References Cited, FOREIGN PATENT DOCUMENTS, insert
-- WO        0170556      9/2001
   WO        9530569      9/1995 --

Drawings,
Fig. 4, "40" should read -- 48 --

Signed and Sealed this

Twenty-second Day of June, 2004

JON W. DUDAS
*Acting Director of the United States Patent and Trademark Office*